United States Patent [19]
Garino et al.

[11] Patent Number: 5,319,447
[45] Date of Patent: Jun. 7, 1994

[54] VIDEO CONTROL CIRCUIT FOR MULTIMEDIA APPLICATIONS WITH VIDEO SIGNAL SYNCHRONIZER MEMORY

[75] Inventors: Pierangelo Garino, Veolpiano; Giovanni Ghigo, Luserna S. Giovanni; Mauro Marchisio, Urin; Giovanni Pucci, Urin; Alfredo Rinaudo, Urin, all of Italy

[73] Assignee: SIP-Societa Italiana per l'Esercizio Delle Telecommunicazioni P.A., Turin, Italy

[21] Appl. No.: 16,686

[22] Filed: Feb. 11, 1993

[30] Foreign Application Priority Data

Mar. 17, 1992 [IT] Italy ............... TO92A000224

[51] Int. Cl.$^5$ .................. H04N 9/67; H04N 9/77
[52] U.S. Cl. ..................... 368/708; 395/154; 345/153; 368/578; 368/580
[58] Field of Search ........... 395/154; 340/703, 703.02, 340/717; 358/21 R, 22, 17.29, 30, 40; H04N 9/67, 9/77

[56] References Cited

U.S. PATENT DOCUMENTS

| | | | |
|---|---|---|---|
| 4,580,165 | 4/1986 | Patton et al. | 358/17 |
| 4,707,727 | 11/1987 | Penney | 358/30 |
| 4,792,846 | 12/1988 | Penny | 358/17 |
| 4,994,912 | 12/1991 | Lumelsky et al. | 358/22 |
| 5,021,873 | 6/1991 | Abumi | 358/21 R |
| 5,070,397 | 12/1991 | Wedderburn-Bisshop | 358/22 |
| 5,150,109 | 9/1992 | Berry | 340/717 |
| 5,220,312 | 6/1993 | Lumelsky et al. | 358/22 |

Primary Examiner—Mark R. Powell
Assistant Examiner—Jeffrey S. Murrell
Attorney, Agent, or Firm—Herbert Dubno

[57] ABSTRACT

The video control circuit is particularly adapted to multimedia applications, wherein image transmission services are offered in addition to usual telephone speech and data transmission services. The circuit is capable of processing both photographic and graphic video images, satisfying both the relevant CCIR standards and the specifications proper to personal computers, VGA EGA, etc. so as to allow the representation of either types of images on an only type of display. To this end, it generates both timings proper to the CCIR standards, for a resolution of 720 columns per 480 lines, with an upper representation limit of graphic planes of 1024 columns per 1024 lines.

8 Claims, 10 Drawing Sheets

VIDEO CONTROL CIRCUIT FOR MULTIMEDIA APPLICATIONS WITH VIDEO SIGNAL SYNCHRONIZER MEMORY

The present invention concerns apparatus for building up multimedia user terminals to be used in the Integrated Service Digital Network (ISDN) and more particularly a video control circuit for multimedia applications.

BACKGROUND OF THE INVENTION

It is well known that in the development of the ISDN network, besides the usual telephone speech and data transmission services, way to the home subscribers, among which transmission of documents by Group 4 facsimile equipment and reception and transmission of photo images at CCIR standard resolution, should be offered.

The Group 4 facsimile is a real time transmission method of texts and images, sent onto the ISDN network with a particular coding and a 64 kbit/s rate, in which the whole process, from the composition moment (acquisition through a scanner, acquisition from the memory of a processor, etc.) up to the reception and printing, is of digital type. Noise immunity is very high and resolution is of 400 pixels per inch, higher that than of the analog facsimile presently used.

There is also the possibility of transmitting photo images, locally obtained with a TV camera, residing in the memory of a processor or received from a distant data bank. Their resolution is that as from studio, foreseen in CCIR 656 recommendation, so that they can be displayed with suitable means in order to obtain good quality images with the same transmission resolution. This type of transmission can be used in a variety of different fields, e.g. it can meet the requirements of estate agents, tour operators, and the like, who could consult centralized data bases regrouping the offers available on the market at that moment. It could resolve the problem of the creation of a general archive of the works of art, facilitating the transmission of the images of paintings, monuments and others to the culture ministry and hence their viewing by the public.

To be able to access in a capillary way all these services, offered within an ISDN network, the subscribers must be equipped with suitable terminals capable of allowing the transmission, the reception, the display and possibly the printing of the exchanged documents. The costs of such terminals can be reduced by the use of the computer which is already widespread in private houses. With the addition of a suitable circuit and a suitable program, it can become the first and more versatile terminal of the ISDN network.

The circuit, which can be housed on one or more printed circuit boards, will permit the computer to carry out complex processing operations of the video signal in real time. It must comprise a video signal memory to be used for image acquisition from a TV camera or for display of images residing in the personal computer itself. Besides it must be equipped with interface circuits for the digital ISDN network. A suitable circuit allowing the computer monitor, operating with its particular TV standard, to display the images with the characteristics specified in CCIR 656 recommendation, also must be provided. Thus resorting to a specific monitor only for displaying the images with the specified characteristics is avoided.

The control program can be permanently stored under firmware format. To date there does not exist on the market a video control circuit capable of carrying out all the operations carried out by the circuit provided by the invention. There exists on the contrary only a series of devices for carrying out some partial functions. They are generally dedicated to the processing of images and particularly to the graphics, and are used in the video control units installed in personal computers and workstations dedicated to CAD processes.

E.g. there are programmable integrated circuits, named "Colour video controller", such as those identified by IMS G300B and described on page 87 and ff. of the catalogue 1990 of INMOS, which implement the real-time control functions of a graphic system and of its display means, e.g. a cathode ray tube (CRT), a laser printer or a color plotter. They can be interfaced with the bus of each standard processor, wherefrom they receive the programs necessary to specify timings and data display characteristics on the screen of the CRT or on a printed sheet. They can also be interfaced with the source of data to be represented, using in both cases dual-port memories which allow speed up of the procedures to the maximum. These controllers contain a video timing generator, completely programmable by the external microprocessor, which generates video synchronism, addresses, data timing and all the display characteristics required, such as: image dimension, vertical and horizontal scanning frequency, presence of interlacing, etc. They contain in addition three totally-programmable memories, the so called "color look-up tables", allowing the representation of output data with a certain number of color chosen out of a larger set. The three RGB flows outgoing from the table are converted into analog form to be directly sent to the video screen.

Moreover, there is another type of integrated circuit, such as those identified by IMS G178, described on page 63 and ff. of the above catalogue 1990 of INMOS, which implement the already-described "Colour look-up table" function, i.e. the storing of the color values to be associated to different screen points. They comprise three biport memories, generally of small capacity, each relative to one of the primary colours processed (RGB=red, green, blue). Each memory is loaded and the contents is updated by the microprocessor controlling the system. The reading of the memories is carried out by using instantaneous values of RGB data flow to be displayed as addresses, each of them corresponding to a suitable value which is presented at the output gate. The three values obtained thus, converted into analog form, form the term determining the color of a pixel of the screen.

As mentioned, these integrated circuits are particularly oriented towards graphic applications in personal computer and workstations, by implementing the typical specifications of graphic cards, such as VGA, EGA, etc. Besides they are apt to process the signals in the format of the fundamental RGB colors, while CCIR standards require that the photographic images be processed in the format of luminance and chrominance components.

SUMMARY OF THE INVENTION

The limitations above are eliminated by the video control circuit for multimedia applications provided by the present invention, which is capable of processing both photographic and graphic video images, by satisfying both the relevant CCIR standards, and the specifications proper to personal computers, VGA, EGA, etc, so as to allow the representation of the two types of images on an only type of display. To this aim, it is capable of generating both the timings proper to the CCIR standards for a resolution of 720 columns per 576 lines, and the timings proper to VGA specification, for a resolution of 640 columns per 480 lines, with an upper representation limit of graphic planes of 1024 columns per 1024 lines.

A video control circuit for multimedia applications, according to the invention which accepts at the input digital video signals according to CCIR 656, and video signals under luminance-chrominance Y,Cb,Cr format and renders available at the output correspondent signals under digital parallel format and separated synchronism signals, standard RGB signals possibly mixed with external video signals coming room an external video memory, can comprise:

a video flow decoder, which receives at the input the video digital signals, and extracts their synchronisms and active data of each line, storing them at the same time in a buffer memory to obtain the synchronization of the outgoing flow, supplied under Y,Cb,Cr format;

a first multiplexer, transferring to the output the digital video flow present at the input or that generated within the control circuit;

a control block, which receives at the input video data under Y,Cb,Cr format together with control signals, synchronizes them using external timings and varies their parallelism supplying them to a first output or converting them into RGB format available at a second output, and controlling an external video memory containing a secondary image superimposable to the current image and supplies synchronism and state signals;

a timing signal generator, programmable by an external-control microprocessor an interface for the dialogue of said block with the control microprocessor;

a second multiplexer, which transfers to the output towards the external microprocessor the data coming either from timing signal generator or from said block; and a conversion block, which converts data in Y,Cb,Cr format into data in CCIR 656 format.

The video flow decoder can comprise:

two registers wherein digital video data and the relevant timings are stored with a certain parallelism and read with a higher parallelism;

a frequency conversion block, basically consisting of a FIFO memory, wherein the digital video data supplied by the registers are stored;

a first finite-state automaton, which extracts the synchronism information present in the digital data flow and renders them available at the output and checks data validity;

a block for detecting synchronism errors, which analyzes data and their parity and corrects an error or signals the presence of two of them to the finite-state automaton;

a register for storing the synchronism state and the relevant parity to send to the block for detecting synchronism errors; and a second finite-state automaton, controlling said frequency conversion block on the basis of the information on the validity of data and clock signals.

The control block can comprise:

a buffer memory of FIFO type, which stores input data under Y,Cb,Cr format and supplies them at the output with higher parallelism;

a block for controlling data routing, which stores input data under Y,Cb,Cr format and supplies them at the output with higher parallelism;

a block for controlling data routing, which operates under the control of the external microprocessor and of data coming from the external video memory, generating the addresses and control signals for the external memory control, for an external video multiplexer, for the memories containing the color palette and supplying the three Y,Cb,Cr components or the code under RGB format to superimpose possibly to the image element coming from the outside;

a third multiplexer, which transfers to the output either the Y,Cb,Cr code, supplied by said block for controlling data routing, or the Y,Cb,Cr code coming from said buffer memory relevant to the main image, under the control of the block for controlling data routing;

an arithmetic unit, which operates data conversion from Y,Cb,Cr format into RGB format;

a fourth multiplexer, which transfers to its output either an RGB code relevant to the external video memory or the RGB code coming from said arithmetic unit, under the control of the block for controlling data routing; and a timing generator, for said block for controlling data routing and for said buffer memory of FIFO type.

The conversion block can comprise:

a set of registers which store Y,Cb,Cr components of the pixel to be converted:

a coding block to generate codes relevant to the synchronism and parity information according to CCIR 656 recommendation;

a fifth multiplexer, mixing the Y,Cb,Cr components outgoing from said set of registers with the codes generated by the coding block;

a third finite-state automaton, which controls the fifth multiplexer and generates control signals for the generation of the synchronism words of CCIR 656 flow; and a chain of registers, synchronizing the data supplied by said fifth multiplexer through a controlled delay and which introduces the synchronism words.

The timing signal generator can have a portion for the generation of horizontal synchronism signals comprising:

a set of registers wherein the external microprocessor loads the values of the different level durations of said horizontal synchronism signals;

a press settable counter, which counts pulses at pixel frequency a first comparator which compares the signal at its first input supplied by the counter with the value present at its second input;

three high-impedance driving circuits, enabled in turn to supply signals, contained in two out of said set of registers to the second input of said first comparator;

a fourth finite-state automaton which enables in turn said driving circuits and enables the counter to load the intiial value supplied by a sixth multiplexer, generating at the output one of said horizontal synchronism signals, on the basis of signals received from the first comparator and from a fifth finite-state automaton;

an adder, which adds to the value supplied by one of the set of registers a constant value;

said sixth multiplexer, which transfers to the output a wired value or the value supplied by the adder to preset the counter;

a seventh multiplexer, which transfers to the output one of the values contained in two of said set of registers;

a second comparator, which compares the signal at its first input supplied by the counter with the value supplied by the seventh multiplexer; and a sixth finite-state automaton, which generates at the output (10b) a second horizontal synchronism signal, on the basis of the signals received by the second comparator, the fifth finite-state automaton, which operates the synchronization of the portion for the generation of horizontal synchronism signals, checking the phase relationship existing between an external synchronism signal with a synchronism signal generated by the sixth finite-state automaton and acting on the seventh multiplexer, on the counter, on the fourth and sixth finite-state automatons.

The timing signal generator can have a portion for the generation of vertical synchronism signals, which comprises:

a first block of registers, wherein the external microprocessor loads the values of the durations of the different levels of a first vertical synchronism signal;

a second presettable counter, which counts the pulses at a frequency twice as high as the line frequency;

a third comparator, which compares the signal at its first input supplied by the second counter with the value present at its second input;

a ninth multiplexer, which transfers to the output one of the values contained in said first block of registers;

a seventh finite-state automaton, which selects the ninth multiplexer and enables the second counter to store the initial value supplied by an eighth multiplexer generating at the output two of said vertical synchronism signals, on the basis of the signals received from the third comparator and from a ninth finite-state automaton;

a second block of registers, wherein the external microprocessor loads the values of the durations of different levels of a second vertical synchronism signal;

a fourth comparator, which compares the signal to its first input supplied by said second counter with the value present at its second input;

a tenth multiplexer, which transfers to the output one of the values contained in said second block of registers;

an eighth finite-state automation, which selects said tenth multiplexer, generating to the output the third of said vertical synchronism signals, on the basis of signals received from the fourth comparator and by a ninth finite-state automaton;

an eighth multiplexer, which transfers to the output a wired value or the value supplied by the tenth multiplexer in order to preset the second counter, on the basis of a signal supplied by a ninth finite-state automaton;

said ninth finite-state automaton, which operates the synchronization of the portion for the generation of vertical synchronism signals, by checking the phase-relationship existing between an external synchronism signal and a synchronism signal generated by the eight finite-state automaton and acting on sixth and eight multiplexer, on the seventh and eighth finite-state automatons.

The arithmetic unit can comprise:

three registers wherein Y,Cb,Cr components, are stored;

read-only memories which, addressed with possible values of Cb and Cr, supply the same multiplied by numerical constants and algebraically summed to others;

a set of registers, wherein the signals supplied by said read-only memories as well as Y component are stored;

a first and a second adder, which sum Y to the values computed by two of said read-only memories to obtain R and B components of RGB signal;

four registers which store and allow synchronization of R and B components;

a third adder, which adds the values computed by two out of the read-only memories;

two registers, which store and allow synchronization of Y component and of the signal supplied by said third adder;

a fourth adder, which adds the signals supplied by said two registers to obtain the G component of RGB signal; and a register, storing and allowing synchronization of the G component.

The block for controlling data routing an comprise:

a third presettable counter, which counts pulses at half-line frequency by generating line addresses o said external video memory;

a first register, wherein the external microprocessor can write the number of the starting line of scanning of the external video memory;

a second register, wherein the external microprocessor can write the number of the starting column of scanning of the external video memory;

a ninth multiplexer, which transfers alternately to the output line or column address of the external video memory received from the third counter or from the second register;

a third register, wherein data arriving from the external video memory are stored;

a tenth multiplexer, which transfers alternately to the output the higher or lower part of the data stored in said third register;

a block, which generates control signals for said third and fourth muliplexers and for an external multiplexer on the basis of the signals supplied by the tenth multiplexer;

a conversion table, which is addressed by the datum supplied by the tenth multiplexer and supplied at the output the value relevant to a pixel, all the values stored being programmable by the external microprocessor; and a fourth register, which stores the values outgoing from the conversion table.

BRIEF DESCRIPTION OF THE DRAWING

The foregoing and other characteristics of the present invention will be made clearer by the following description of a preferred embodiment thereof, with reference to of non limiting example, and by the annexed drawing, wherein.

SPECIFIC DESCRIPTION

The video control circuit accepts at the input a digital video signal according to CCIR 656 recommendation and renders it available at the output still in digital form with 16 bit parallelism and with separated synchronism signals.

In addition it accepts at the input a digital video signal in luminance-chrominance format (Y,Cb,Cr), mixes it with another 8 bit video signal and converts it into a standard RGB signal for color monitor.

The same RGB output is converted into a digital video signal according to CCIR 656 recommendation.

Programming the image format from the outside is possible with: number of lines per each field, number of pixels per each line, operation in interlaced or non-interlaced mode.

The whole timing can be synchronized by signals supplied from the outside and all the functions can be programmed from the outside by a microprocessor.

Figure 1:
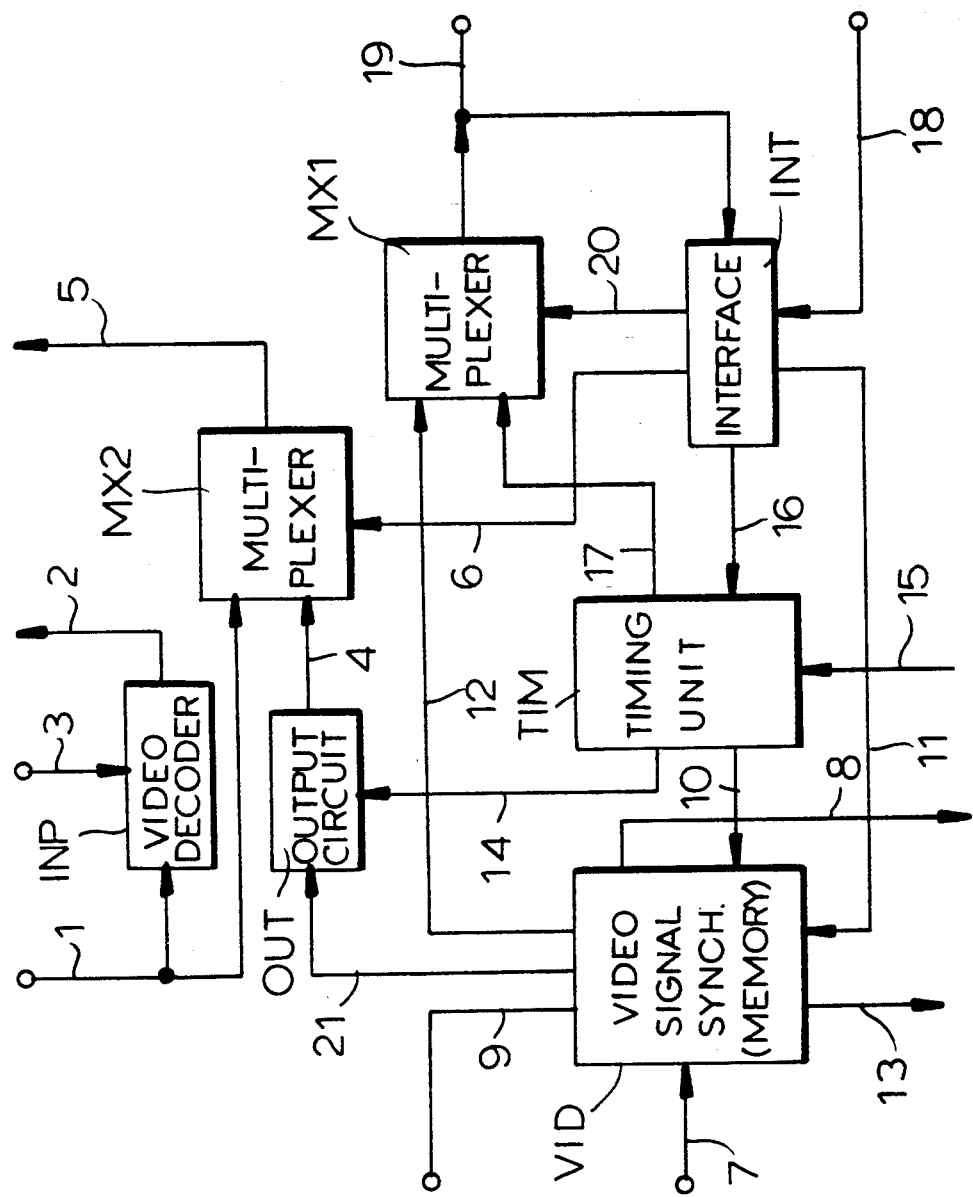
FIG. 1 is the general block diagram of the control circuit.

The general block diagram of the control circuit is shown in FIG. 1.

8-bit digital video signals reach through connection 1 a block INP, which is the video-flow decoder. It extracts synchronism and active data in each line, temporarily storing them in a buffer memory to obtain output flux synchronization, supplied on connection 2. In addition to line and field synchronism and field parity code, on connection 2 there are output 16-bit video data in Y,Cb,Cr format. On connection 3 block INP receives control signals of the emission of video data. Connection 1 reaches also block MX2, a multiplexer allowing sending to output 5 the digital video flux present on connection 1 or the one present on connection 4, under the control of the signal on wire 6. In this way there is sent to the output either the same input flux or the one generated inside the control circuit by block OUT.

16-bit video data in Y,Cb,Cr format arrive from the outside through connection 7, together with signal for controlling data input, i.e. enabling, clock, selection signals. They are led to block VID, which synchronises them using timings established from the outside and converts them into RGB format, making them available on connection 8 with a 24-bit parallelism, plus the clock signal. The same data are made available in Y,Cb,Cr format, still with 24 bit parallelism, on connection 21.

Through connection 9 block VID carries out also the control of an external video memory, containing a secondary image superimposable to the current image named "overlay memory". More particularly VID generates on connection 9 the addresses, and at varying instants, receives video data and synchronism signals.

All the timing signals, needed by clock VID, are sent via block TIM through connection 10. Among them there are the signals specifying pixel position, whose value is sent onto connection 8, consisting of horizontal and vertical synchronism and of pixel clock.

Block VID interfaces the control microprocessor through block INT and connections 11 and 12. Through connection 11 it receives from the microprocessor the commands for programming its registers and through connection 12 it allows the microprocessor to read its operating condition.

Finally, through connection 13, block VID renders available to the outside vertical, horizontal and parity signals, as well as state signals, e.g. filling state of the buffer memory, and a control signal for an external video multiplexer, allowing the image present on connection 8 to be combined with an external video image.

Block TIM generates the timing signals for the whole circuit, sending them both on the already examined connection 10, and on connection 14 towards block OUT. Block TIM receives from the outside the pixel clock and external horizontal and vertical synchronism signals through connection 15. Two connections 16 and 17 allow the external microprocessor to program and check the block operation respectively.

Block INT allows address signal decoding coming from the external microprocessor on connection 18, granting it the access to one of the internal registers. The datum to be written at the specified address is to be rendered available by the microprocessor on connection 19, at the input to block INT, which forwards it on connections 11 and 16. Connection 20 presents the address of the register the microprocessor wants to read to block MX1, a multiplexer which transfers to the output on connection 19 one of the data present on connections 12 or 17.

Finally, block OUT converts 24-bit data under Y,Cb,Cr format, present on connection 21, into data under CCIR 656 format, it renders available on connection 4. Timings for the correct operation of OUT are supplied by block TIM through connection 14.

Figure 2:
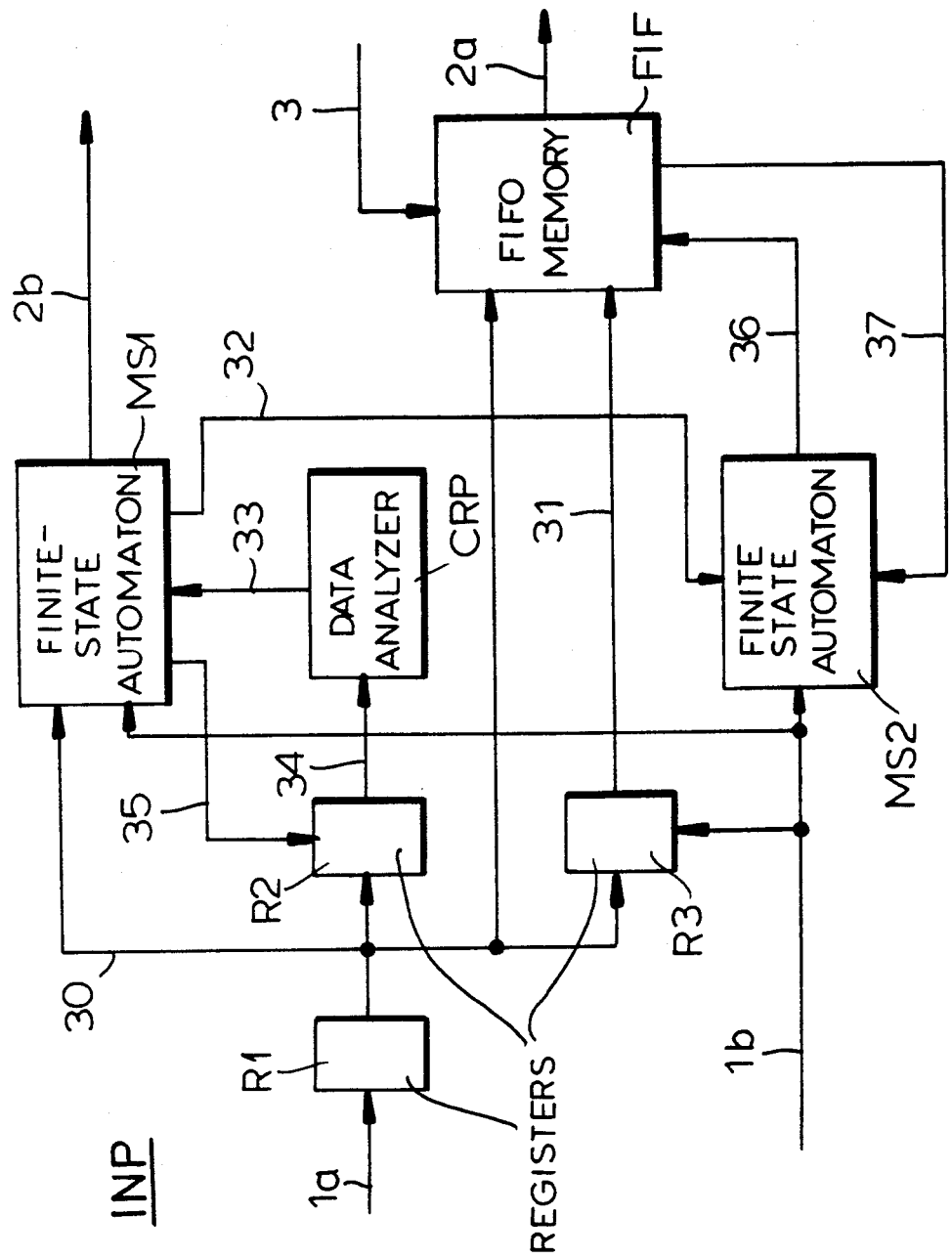
FIG. 2 is the block diagram of the block denoted by INP in FIG. 1.

FIG. 2 shows the block diagram denoted by INP on FIG. 1, which operates video flow decoding.

Digital video data and relevant timings, present on connections 1a and 1b respectively, are first stored in a register R1 and then transferred into a register R3, both of them with 8-bit parallelism. As a result of the storing and of transferring, on connection 31 there is the first input datum and on connection 30 the second datum, which can now be taken as an only 16-bit datum and sent to block FIF. Thanks to parallelism doubling, the frequency of data sent to FIF is equal to half that of the arriving data. Which renders constraints on the performance of block FIF less stringent in terms of operating speed.

Connection 30 reaches also a block MS1, consisting of a finite state automaton, which extracts synchronism information present in the digital data flow and renders them available on connection 2b. Besides it generates on connection 32 a signal indicating that the data present on connections 31 and 30 are significant to block FIF. Block MS1 is clocked by the signal present on connection 1b, at the same frequency of the arriving data.

Through wire 33, MS1 receives an enabling signal when a block CRP realizes that the information on video synchronism contains some errors. In fact block CRP receives through connection 34 the code containing synchronism state and relative parity from a register R2. CRP effects the analysis of data and of their parity and is capable of correcting an error and signalling the presence of two errors. In the first case it sends the correct synchronism information to MS1, while in the second case blocks MS1 at the preceding state. Register R2 receives its timing signal from MS1, so as to be able to extract at the suitable instant the synchronism word from the input data flow.

Block, FIF, basically consisting of a FIFO memory, allows the input data frequency to be matched with the output data frequency. It is controlled by a finite-state automaton MS2 though connection 36, on which selection signals and writing pulses are transiting. To generate these signals, MS2 needs information on the validity of data supplied by MS1 on connection 32 and of the clock signal present on connection 1b. Besides block FIF communicates to MS2 on wire 37 the possible fullness of FIFO memory, by blocking further writing operations. Finally, FIF receives selection signals and pulses of data reading in memory FIFO through connection 3, by supplying them onto a 16-bit connection 2a.

Figure 3:
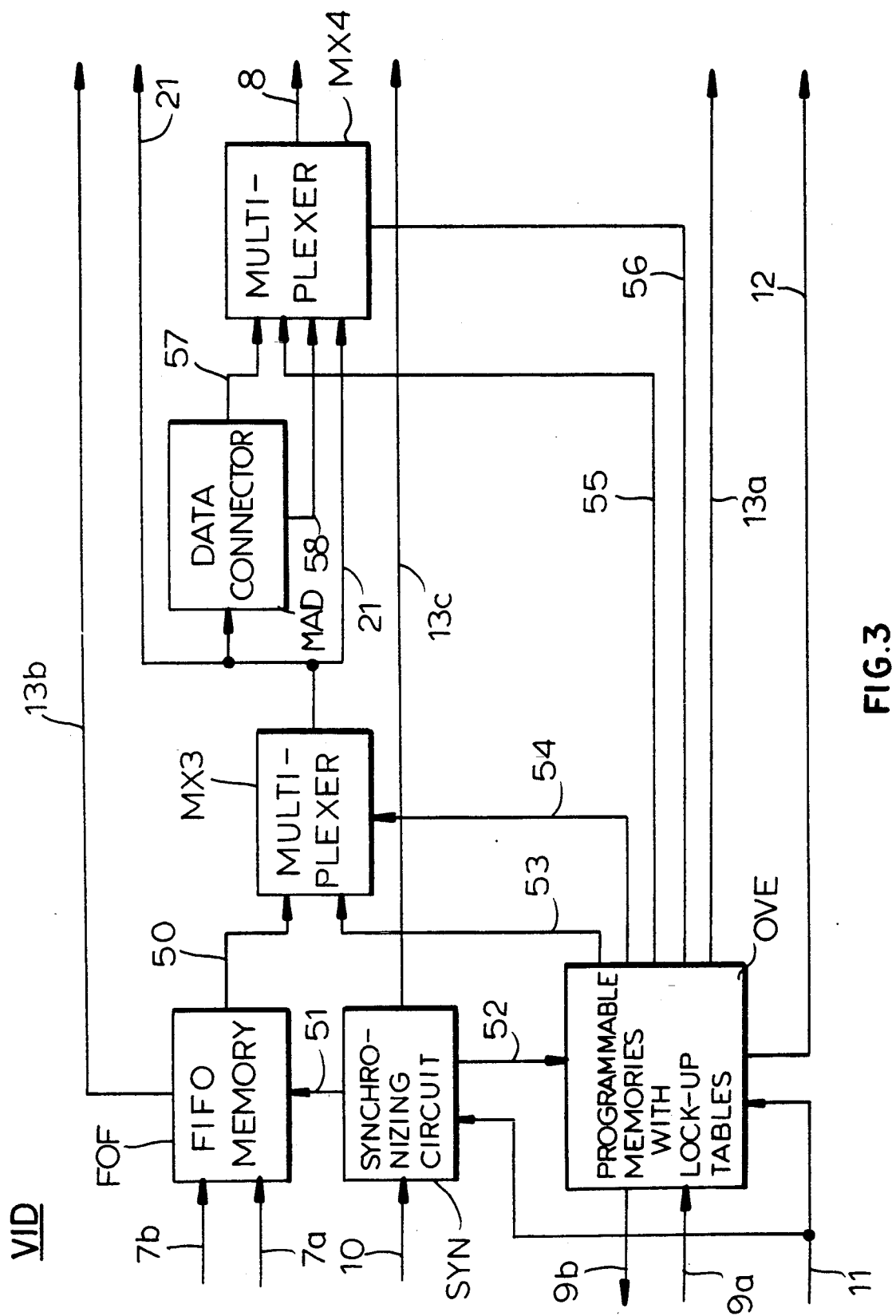
FIG. 3 is the block diagram of the block denoted by VID in FIG. 1.

FIG. 3 represents a block diagram of the block denoted by VID in FIG. 1. Through connection 7a the 16-bit video data under the Y,Cb,Cr format, coming from an external video memory, enter the block and are inserted into a buffer memory of the FIFO type, denoted by FOF. The timing relevant to the writing of these data, enabling, clock, selection, arrives on the contrary through 3-wire connection 7b.

Block FOF reorganizes data so as to present them at the 24-bit output 50. Timing signals controlling output data flow are generated by block SYN, which supplies them on connection 51.

Block FOF signals to the outside of the circuit the emptiness state of FIFO memory by a signal sent onto connection 13b, so as to inform the external microprocessor of the necessity of sending new data.

Block OVE controls the data routing inside the whole block VID on the basis of its programming, set by the external microprocessor, and also of the data coming from the external overlay memory on connection 9a. On connection 9b it generates the addresses and control signals for the external memory and on wire 13a a signal for controlling an external video multiplexer, as previously already disclosed. It is given necessary timing by block SYN on connection 52.

Block OVE contains at its inside registers controlling the operation of the external overlay memory and of the memories containing the look-up tables. Registers and memories are programmable by an external microprocessor through connection 11. On 24-bit connection 53 there is the output of the color memory with three Y,Cb,Cr components per each pixel. Colour memory contains 16 possible colors, the one specified by the contents of the external overlay memory for to that pixel being used. One of these colors is used as a code to signal the non-superposition of the overlay image. Block OVE decodes this particular code and as a consequence controls through wire 54 a multiplexer MX3, so that either Y,Cb,Cr code present on connection 53, or Y,Cb,Cr code arriving from block FOF, relevant to the main image, is transferred to the output 21.

Analogously, 24-wire connections 55 and 56 carry respectively the code under RGB format relevant to the overlay image element and the control signal for a multiplexer MX4, which transfers to its output 8 either the code or the one, still under RGB format, coming from block MAD onto 24-wire connection 57.

Through connection 12 the external microprocessor reads block OVE state, i.e. the contents of the registers previously written and some test bits.

Block SYN, starting from timing signals coming on connection 10, generates timings for blocks FOF and OVE, phase shifted so as to ensure data coherence on connections 50 and 53 or on connections 57 and 55. In fact, in the case the mixing is carried out by MX4, the delay introduced by block MAD is to be taken into account for the phase shift. Finally, horizontal and vertical synchronism and field parity signals of the image outgoing on wire 8 are present on connection 13c. The choice of the type of phase shift to be applied to its outputs 51 and 52 is carried out on the basis of the information received on wire 11.

Block MAD converts data under Y,Cb,Cr format, present on connection 21, into data under RGB format, and renders them available on connection 57. MAD consists of an arithmetic unit capable of carrying out the additions and multiplications necessary to the conversion.

Some intermediate results, which are rendered available on connection 58 for test purposes, can be led to output 8 through multiplexer MX4. The latter besides mixing signals on connections 55 and 57 in normal operation, can transfer to the output on connection 8 the signals on connections 58 or 21 during the operation in test mode.

Figure 4:
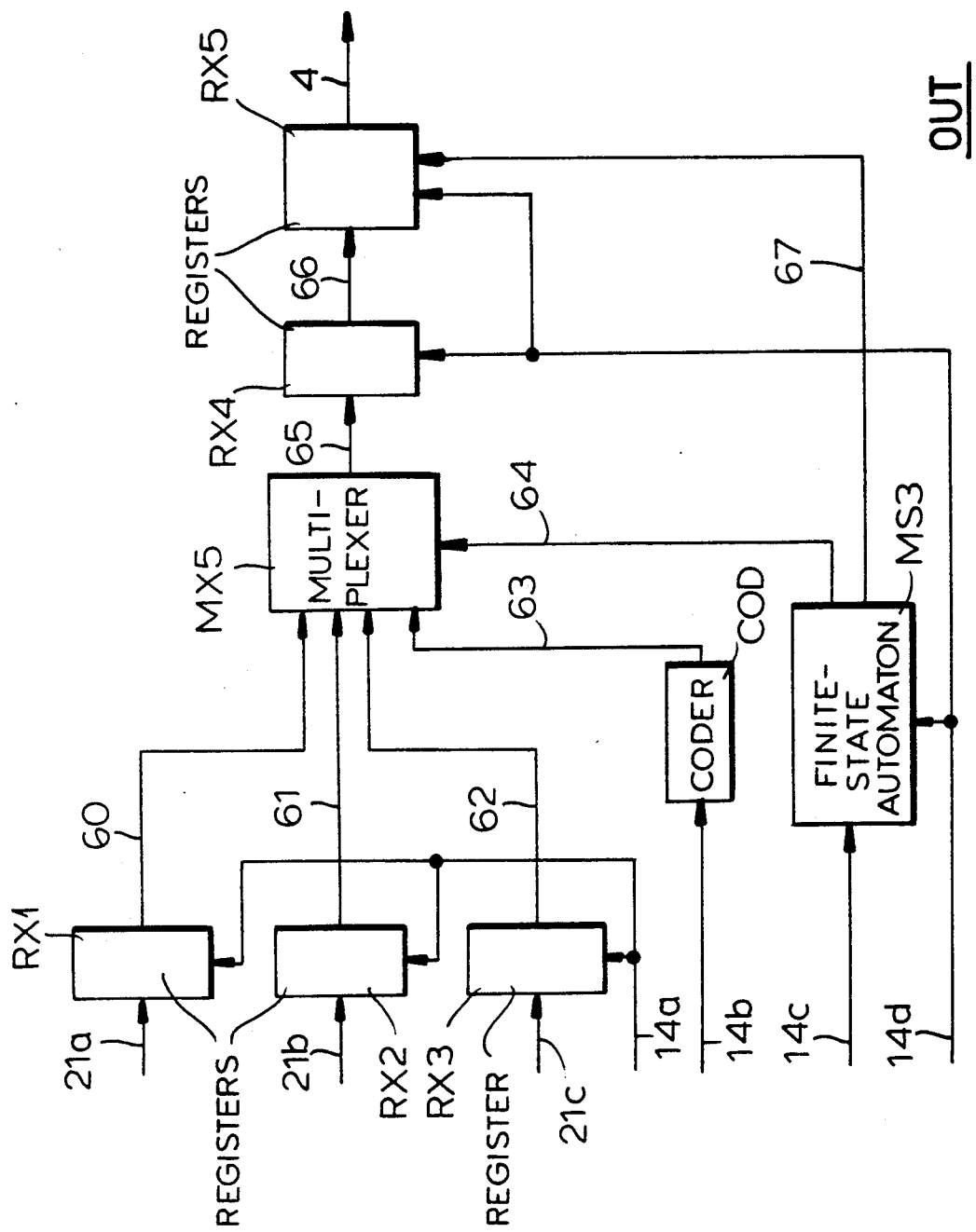
FIG. 4 is the block diagram of the block denoted by OUT in FIG. 1.

FIG. 4 shows the block diagram of the block denoted by OUT in FIG. 1. Y,Cb,Cr components of the pixel to be converted into CCIR 656 format are present at the input on connections 21a, 21b and 21c respectively. The three sets of 8-bit signals are stored in registers RX1,RX2, and RX3, which receive timing blocks from block TIM (FIG. 1) through wire 14a. CCIR 656 flow is obtained by duly combining Y,Cb,Cr values present at outputs 60, 61, and 62 of registers RX1, RX2 and RX3 through a multiplexer MX5. The codes relevant to synchronism and parity information, present inside CCIR 656 flow, are generated by a block COD, by which they are supplied onto 8-bit connection 63 on the basis of the synchronism signal state present on connection 14b.

Multiplexer MX5 is controlled by connection 64 by a finite state automaton MS3, which generates also on connection 67 control signals for generation of the synchronism words of CCIR 656 flow. The synchronism sequence consists of a word formed by all ones, followed by two words formed by all zeros. To obtain that, MS3 sends suitable set and reset signals to a register RX5, on the basis of synchronism signals generated with a suitable phase shift by block TIM (FIG. 1) on connection 14c. Clock signal at pixel frequency for automaton MS3 and registers RX4 and RX4 is present on connection 14d. This chain of registers transfers the data present at MX5 output on connection 65 to output connection 4, duly synchronized thanks to the delay operated by RX4 and RX5, which introduces also the synchronism words.

Figure 5:
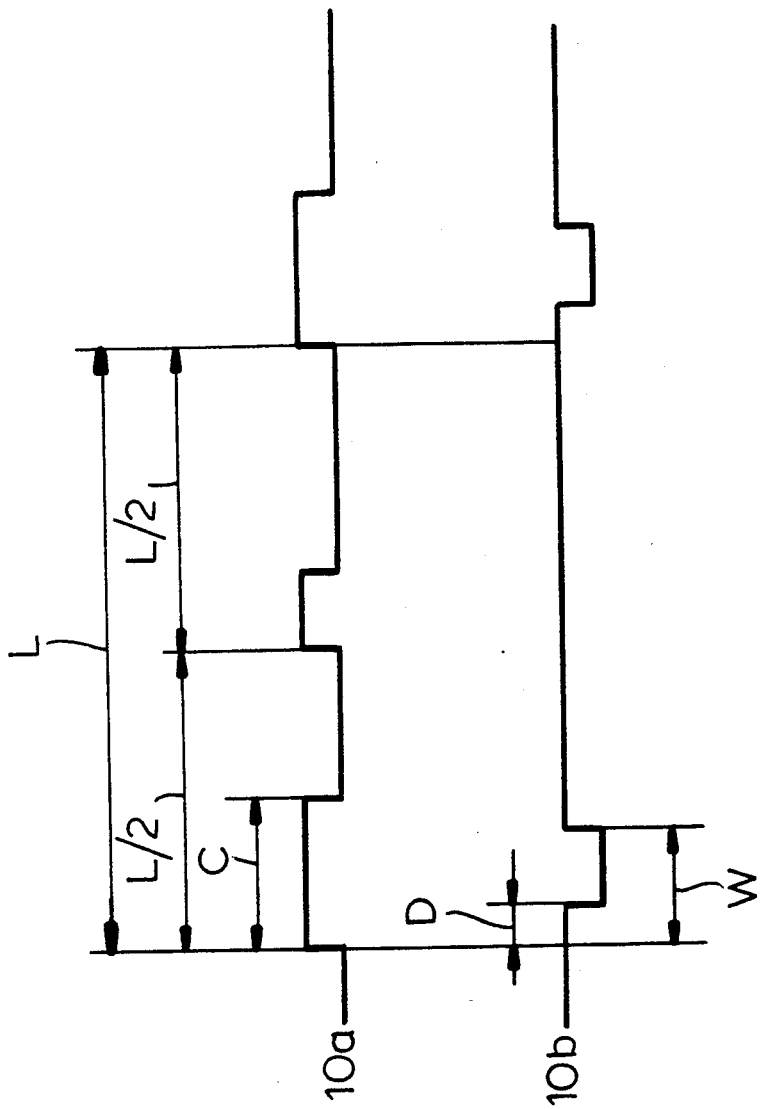
FIG. 5 is a time diagram relevant to horizontal timing generated by block TIM of FIG. 1.

FIG. 5 shows the waveforms generated by block TIM (FIG. 1) relevant to the horizontal timing.

The waveform denoted by 10a, which reference is equal to that of the wire whereupon it is present, is characterised by two time durations L and C. Value L represents the period of the waveform expressed in number of clock pulses and corresponds to the time duration of a line on the screen, whilst C, always expressed in number of clock pulses, represents the duration of the line blanking pulse. Waveform 10a still contains a pulse with the leading edge exactly positioned at the middle between the trailing edges of the two adjacent pulses.

This waveform is used as a clock signal by the vertical timing circuit.

The waveform denoted by 10b, as the wire on which it is present, has a period still equal to L and is characterized by two time durations D and W, which represent the delay of the trailing and leading edges with respect to the beginning of the period.

These waveforms are used as horizontal synchronism signals.

Figure 6:
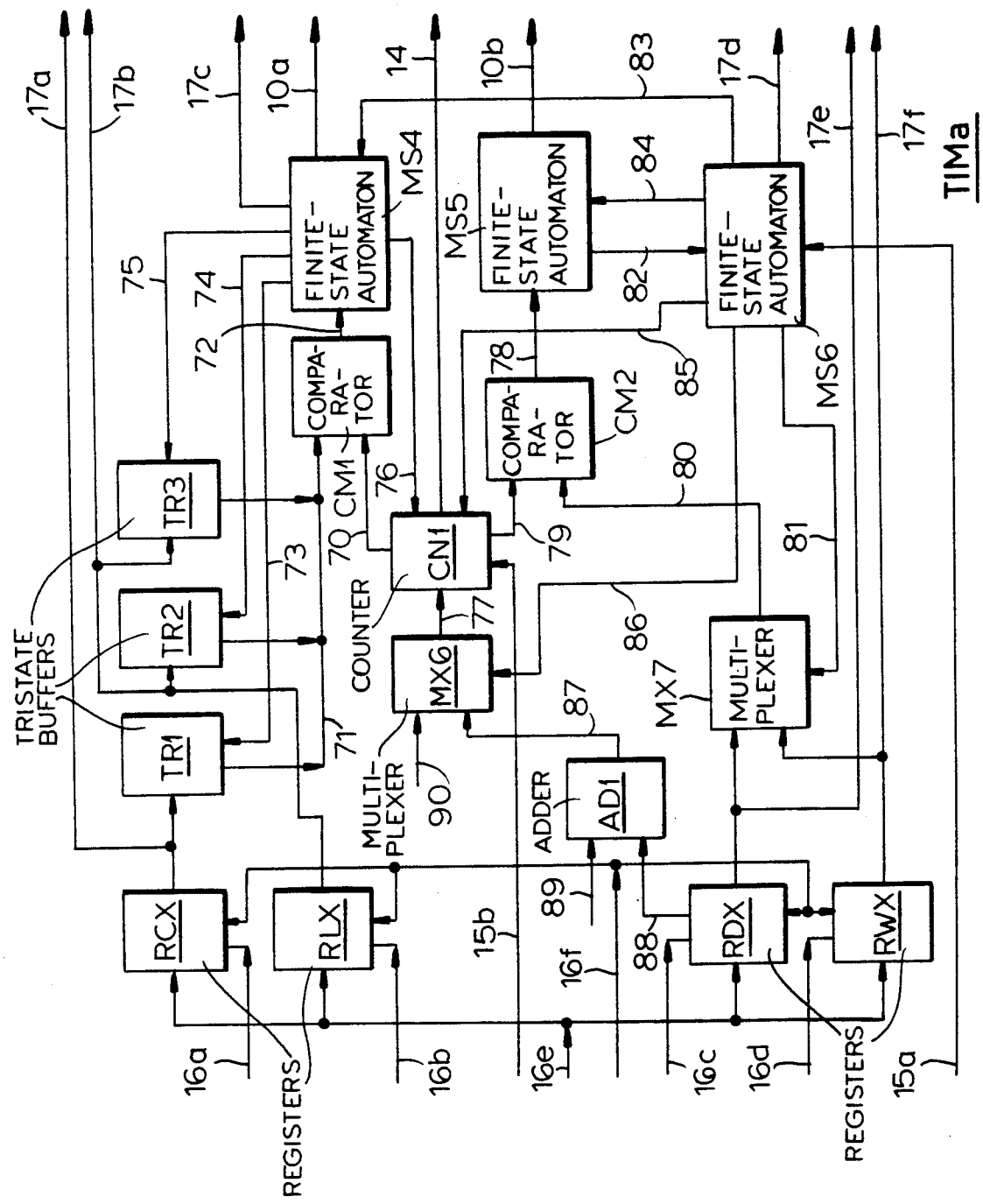
FIG. 6 is the block diagram of part TIMa of the block denoted by TIM in FIG. 1.

FIG. 6 shows the portion of the block TIM, denoted by TIMa, which generates the just described waveforms. Values L,C,D,W are contained in registers RLX,RCX,RDX and RWX, respectively; these registers, at the presence of a suitable signal on wire 16f, are located with initial values corresponding to standard TV format.

Each individual register can be reached by the external microprocessor, which can change the initial values by modifying as a consequence the image format. The microprocessor presents data on connection 16e and, through enabling signals on wires 16a,16b,16c,16d, writes them in the four registers RCX,RLX,RDX,RWX. In case their contents are to be read, the microprocessor reaches the registers through connections 17a,17b,17e and 17f.

An important function is carried out by 11-bit counter CN1, which counts at the pixel frequency the pulses present on wire 15b. The outputs of the counter on connection 70 are sent to a comparator CM1, which emits at its output 72 a signal indicating when counter CN1 output and the value present on connection 71 are equal. This value is supplied by one of the three high impedance driving circuits (Buffer tristate) TR1, TR2, TR3, enabled in turn by finite-state automaton MS4 through connections 73,74,75.

Finite-state automaton MS4 is the circuit generating at its output the waveform 10a (FIG. 5). At the beginning MS4 enables through wire 73 buffer TR1, which as a consequence presents on connection 71, at the input of comparator CM1, the contents of register RCX, i.e. the value C of the waveform 10a (FIG. 5). When the counting value of CN1 reaches C, MS4 receives on wire 72 the pulse signalling the equality found by CM1 and resets the signal on wire 10a, initially set to 1. Thus a pulse of duration equal to C clock pulses is obtained.

At this instant, MS4 inhibits through wire 73 buffer TR1 and enables through wire 74 buffer TR2. The latter presents on connection 71 the value contained in RLX multiplied by 4. When counter CN1 reaches this value, MS4 sets to 1 the signal on wire 10a and keeps it at one for two clock pulses.

Meanwhile, TR2 is inhibited and TR3 is enabled through wire 75. Buffer TR3 presents and TR2 enabled through wire 75. Buffer TR3 presents in turn on wire 71 the value contained in RLX multiplied by 8. When CN1 reaches this value, which represents the duration of a horizontal line in number of clock pulses, MS4 sets to one the signal on wire 10a, enables through wire 76 counter CN1 to load the initial value supplied by multiplexer MX6 on connection 77, inhibits TR3 and re-enables TR1, to start a new cycle.

During the testing phase, it is possible to observe the operation of finite-state automaton MS4 through connection 17c, made available to the outside.

The waveform on wire 10b is generated by a finite-state automaton MS5. It receives on wire 78 the pulses signalling the equality found out by a comparator CM2 between the value supplied by counter CN1 on connection 79 and the value supplied on connection 80 by a multiplexer MX7. The latter, controlled by a finite-state automaton MS6 through wire 81, presents alternately on connection 80 the values present on connections 17e and 17f, consisting of values contained in registers RDX and RWX respectively.

At first on connection 80 there is the value contained in RDX; when counter CN1 reaches such a value, MS5 resets the signal on wire 10b. At the same time MS5 signals to MS6 through wire 82 its state change, that's why MS6 switches through wire 81 multiplexer MX7, which transfers onto connection 80 the contents of register RWX. When the counter CN1 reaches this new value, MS5 sets to 1 the signal on wire 10b, to start then a new cycle starting from the following line.

The synchronization of the whole circuit TIMa with an external horizontal synchronism signal is carried out by finite-state automaton MS6. This automaton checks the phase relation existing between the external synchronism signal, present on wire 15a, with the synchronism signal generated by MS5 on wire 82. If the phase shift differs by a certain predetermined value, e.g. ±3 clock pulses, automaton MS6 operates resynchronization of the whole circuit by acting on MS4,MS5,CN1 by means of wires 83,84,85. In MS4 and MS5 it resets the outputs and in CN1 loads the value present on connection 77. In case of resynchronization, MS6 controls through wire 86 multiplexer MX6 so that it present on connection 77 the signal at the output 87 of an adder AD1. The latter sums up to value D, present on connection 88, a constant value N, present under wired form on connection 89. In this way, counter CN1 is loaded with value D+N, where N represents the intervention delay of automaton MS6.

Once the synchronism is attained, MS6 switches MX6 so as to cause the transfer on connection 77 of a constant value M, present under wired form on connection 90. This value represents the delay introduced by MS4 when loads CN1 through wire 76.

During the testing phase, it is possible to observe the operation of finite-state automaton MS6 through connection 17d, made available to the outside.

Figure 7:
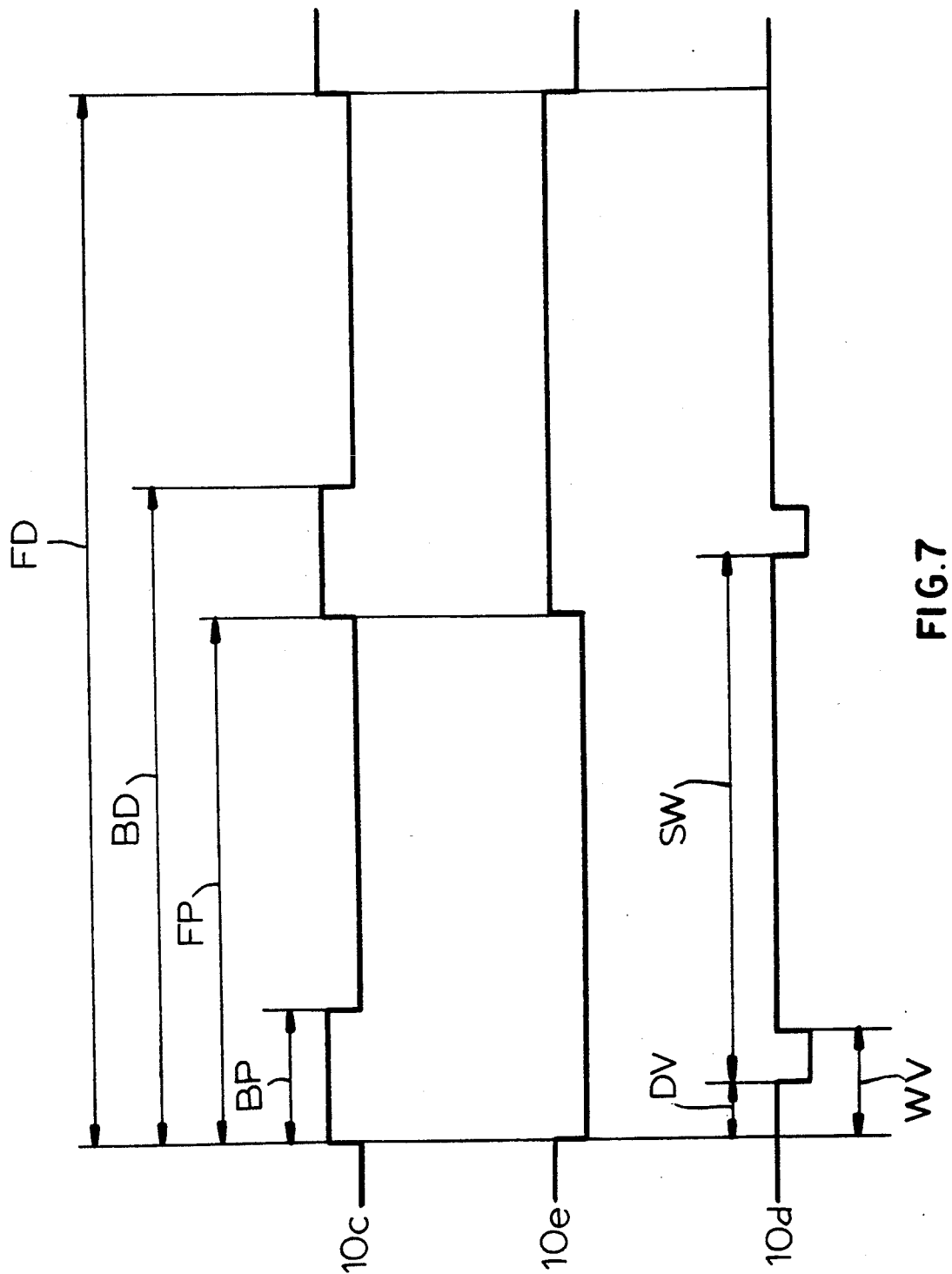
FIG. 7 is a time diagram relevant to vertical timing generated by block TIM of FIG. 1.

FIG. 7 shows the waveforms generated by block TIM (FIG. 1) relevant to the vertical timing.

The waveform denoted by 10c, which reference is equal to that of the wire whereupon it is present, is characterized by four time durations BP, FP, BD and FD, expressed in number of half-lines of TV frame. Value FD represents the waveform period and corresponds to time duration of a complete frame on the screen, while FP represents the duration of the even field. Value BD indicates the instants at which ends the retrace of the odd field and value BP represents the duration of retrace of the even field.

The waveform denoted by 10d, which reference is equal to that of the wire whereupon it is present, has a period always equal to FD and is characterised by three time durations DV,WV and SW, which represent respectively the delay of trailing edge, the delay of leading edge with respect to the beginning of the period and the interval between two subsequent trailing edges. This waveform is used as a vertical synchronism signal.

The waveform denoted by 10e represents a parity signal which identifies even and odd fields.

Figure 8:
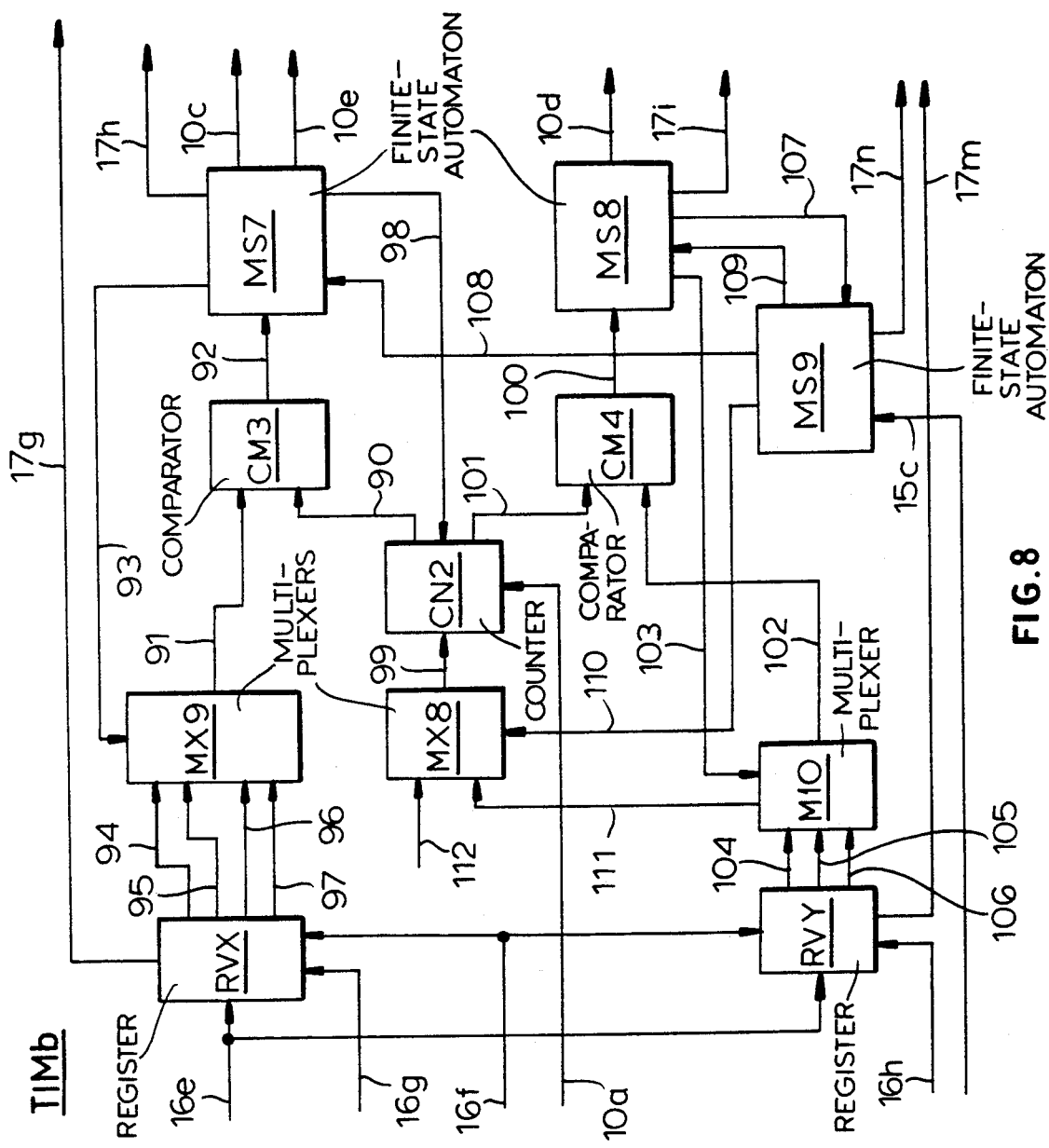
FIG. 8 is the block diagram of the portion TIMb of the block denoted by TIM in FIG. 1.

FIG. 8 shows the portion of the block TIM, denoted by TIMb, which generates the just described waveforms. Values BP,FP,BD and FD are contained in the block of registers RVX; these registers, at the presence of a suitable signal on wire 16f, are loaded with initial values correspondent to the standard TV format.

Each individual register can be reached by the external microprocessor, which can change the initial values by modifying as a consequence the image format.

Another group of registers RVY contains values DV,WV and SW. They also take up initial values under the control of the signal on wire 16f and can be written by the external microprocessor.

The microprocessor presents data on connection 16e and, through enabling signals on connection 16g for RVX and 16h for RVY, writes them in the block of registers selected. In case their contents are to be read, the microprocessor reaches the registers through connections 17g and 17m.

An important function is carried out by 11-bit counter CN2, which counts at halfline frequency, i.e. at a frequency twice as high as the line frequency, the pulses present on wire 10a. The outputs of the counter on connection 90 are sent to a comparator CM3, which emits at its output 92 a signal indicating when equality between the output of counter CN2 and the value present on connection 91 is reached. This value is supplied by a multiplexer MX9, addressed by finite state automaton MS7 through connection 93.

Finite-state automaton MS7 is the circuit generating at its outputs waveforms 10c and 10e (FIG. 7). At the beginning MS7 enables through connection 93 multiplexer MX9, which as a consequence presents on connection 91, at the input of comparator CM3, the contents of register RVX, made available on connection 94, i.e. the value BP of the waveform 10c (FIG. 7). When the counting value of CN2 reaches BP, MS7 receives on wire 92 the pulse signalling the equality found out by CM3 and resets the signal on wire 10c, initially set to 1. Thus, a pulse of duration equal to BP half-lines is obtained.

At this instant, MS7 switches through wire 93 multiplexer MX9, so as to present on connection 91 the value FP contained in RVX and present on connection 95. When counter CN2 reaches this value, MS7 sets to 1 the signal on wire 10e, switches MX9 so that on connection 91 may appear signal BD, present on connection 96, and waits for the signalling of comparator CM3, indicating that this new value has been reached by CN2. Hence MS7 resets to zero the signal on wire 10c and switches MX9 so as it may present on connection 91 signal FD present on connection 97.

When CN2 reaches this value, which represents the duration of a frame in number of half-lines, MS7 sets again to one the signal on wire 10c. Besides it enables through wire 98 counter CN2 to load the initial value supplied by multiplexer MX8 on connection 99 and switches again MX9 to start a new cycle. During the testing phase, it is possible to observe the operation of finite-state automaton MS7 through connection 17h, made available to the outside.

The waveform on wire 10d is generated by a finite-state automaton MS8. It receives on wire 100 the pulses signalling the equality found out by a comparator CM4 between the value supplied by counter CN2 on connection 101 and the value supplied on connection 102 by a multiplexer M10. The latter, controlled by a finite-state automaton MS8 through connection 103, presents alternately on connection 102 values DV and WV present on connections 104 and 105, or the same values summed up to value SW present on connection 106.

At first on connection 102 there is value DV; when counter CN2 reaches such a value, MS8 resets the signal on wire 10d. At the same time MS8 signals to MS9 through wire 107 its state change and switches M10 so that it transfers on connection 102 value WV. When counter CN2 reaches this new value, MS8 sets again to 1 the signal on wire 10d and switches M10 so that it may present on connection 102 the sum of the values present on connections 104 and 106. Thus the pulse generation cycle of the signal on wire 10d is repeated, by using this time values DV plus SW and WV plus SW. At the end of the pulse value DV is presented again to comparator CM4 and the circuit is prepared for the subsequent frame.

Finite-state automaton MS8 can be controlled during testing phase by the external microprocessor through connection 17i.

The synchronization of the whole circuit TIMb with an external vertical synchronism signal is carried out by finite-state automaton MS9. This automaton checks the phase relation existing between the external synchronism signal, present on wire 15c, with the synchronism signal generated by MS8 on wire 107 MS9 counts the number of subsequent times wherein phase coincidence between the above-mentioned synchronism signals is lacking; when this number exceeds a certain predetermined value, automaton MS9 carries out resynchronization of the whole circuit acting on MS7 and MS8 through wires 108 and 109. In MS7 and MS8 it resets the outputs, which operation causes loading of the value present on connection 99 in CN2. In case of resynchronization, MS9 controls through wire 110 multiplexer MX8 so that it may present on connection 99 the signal on connection 111, which represents value DV plus a constant value P, present under wired form in M10. In this way, counter CN2 is loaded with the value DV+P, wherein P represents intervention delay of automaton MS9.

Once the synchronism has been attained, MS9 switches MX8 so as to cause the transfer on connection 99 of a constant value R, present under wired form on connection 112. This value represents the delay introduced by MS7 when CN1 loads through wire 98.

During the testing phase, it is possible to observe the operation of finite-state automaton MS9 through connection 17n, made available to the outside.

The operation of the just-described block TIMb refers to interlaced mode. The circuit can also operate in non-interlaced mode; the operation is analogous, but values FP,BD, and SW are no longer used.

Figure 9:
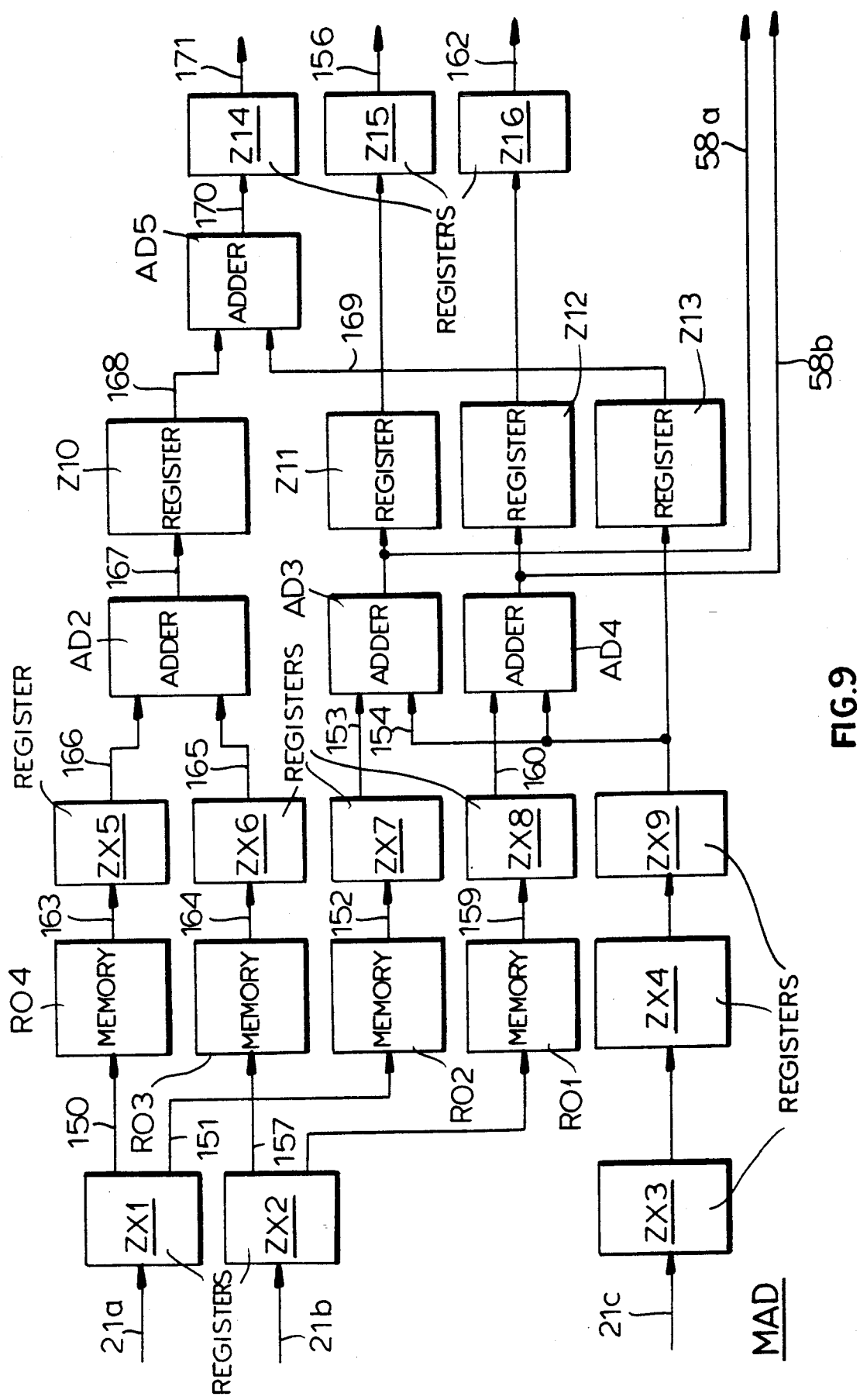
FIG. 9 is the block diagram of the block denoted by MAD in FIG. 3.

Circuit MAD, presented while describing FIG. 3, is represented in the block diagram of FIG. 9.

It operates the conversion from Y,Cb,Cr format into RGB format. As known, the three R,G,B components can be expressed in comparison with Y,Cb,Cr components by the following formulae:

$$R = 1.36875 \ Cr + Y - 175$$

$$G = Y - 0.69072 \ Cr - 0.33755 \ Cb + 132$$

$$B = 1.7381 \ Cb + Y - 222$$

The Y,Cb,Cr components are presented at MAD input on connections 21c,21a,21b respectively and are stored in registers ZX3,ZX1,ZX2. From register ZX1

Cb component is sent to two read-only memories RO2 and RO4 through connections 151 and 150. Memory RO2 carries out multiplying operation of 256 values of Cb by 1,7381 and the subtraction of 222 from the results, using the previously computed and permanently stored values. The result of the operations carried out by RO2 is led through connection 152 to a register ZX7, wherein it is stored and rendered available on connection 153 for an adder AD3. The other input of the adder receives through connection 154 the value Y, suitably delayed by the bank of registers ZX3,ZX4,ZX9 to take into account propagation delays through read-only-memory RO2. At the output of AD3, on connection 58a, is then available the true value of B component. B is further delayed by the chain of registers Z11 and Z15, to take into account the propagation delays through an adder AD5, and is then made available at the output on connection 156.

Analogously for the generation of R component, from register ZX2 the Cr component is sent to two read-only memories RO3 and RO1 through connections 157 and 158. Memory RO1 carries out the multiplication of 256 values of Cr by 1,36875 and subtraction of 175 from the results, using previously computed and permanently stored values. The result of the operations carried out by RO1 is led through connection 159 to a register ZX8, whereby it is stored and rendered available on connection 160 for an adder AD4. The other input of the adder receives through connection 154 the value Y, suitably delayed by the chain of registers ZX3,ZX4,ZX9 to take into account propagation delays through read-only memory RO1. At the output of AD4, on connection 58b, the true value of R component is then available, R is further delayed by the chain of registers Z12 and Z16, to take into account the propagation delays through an adder AD5, and is made available at the output on connection 162.

As to generation of G component, Cb and Cr components are read out from registers ZX1 and ZX2 through connections 150 and 157 and read-only memories RO3 and RO4 are addressed. The operations of multiplication of Cr by −0.6972 and addition of 66 to the result take place in RO3, whilst the operations of multiplication of Cb by −0.33755 and addition of 66 to the result take place in RO4. Subdivision of additive coefficient into two parts allows simplification of read-only memories RO3 and RO4.

The results of the operations carried out by RO3 and RO4 are led through connections 164 and 163 to registers ZX6 and ZX5, where they are stored and made available on connections 165 and 166 for an adder/subtracter AD2, wherein they are summed up to each other. The result of the addition, available on connection 167, is stored in register Z10 and through connection 168 is led to adder AD5. The other input of the adder receives through connection 169 the value Y, previously delayed in the chain of registers ZX3,ZS4,ZX9 and Z13, to take into account propagation delays through read-only memories RO3, RO4 and adder AD2.

At the output of AD5, on connection 170, the true value of G component is then available. G is stored in register Z14 and rendered available at the output on connection 171.

To facilitate the testing phase of memories RO1 and RO2, connections 58a and 58b are rendered available to the outside.

Figure 10:
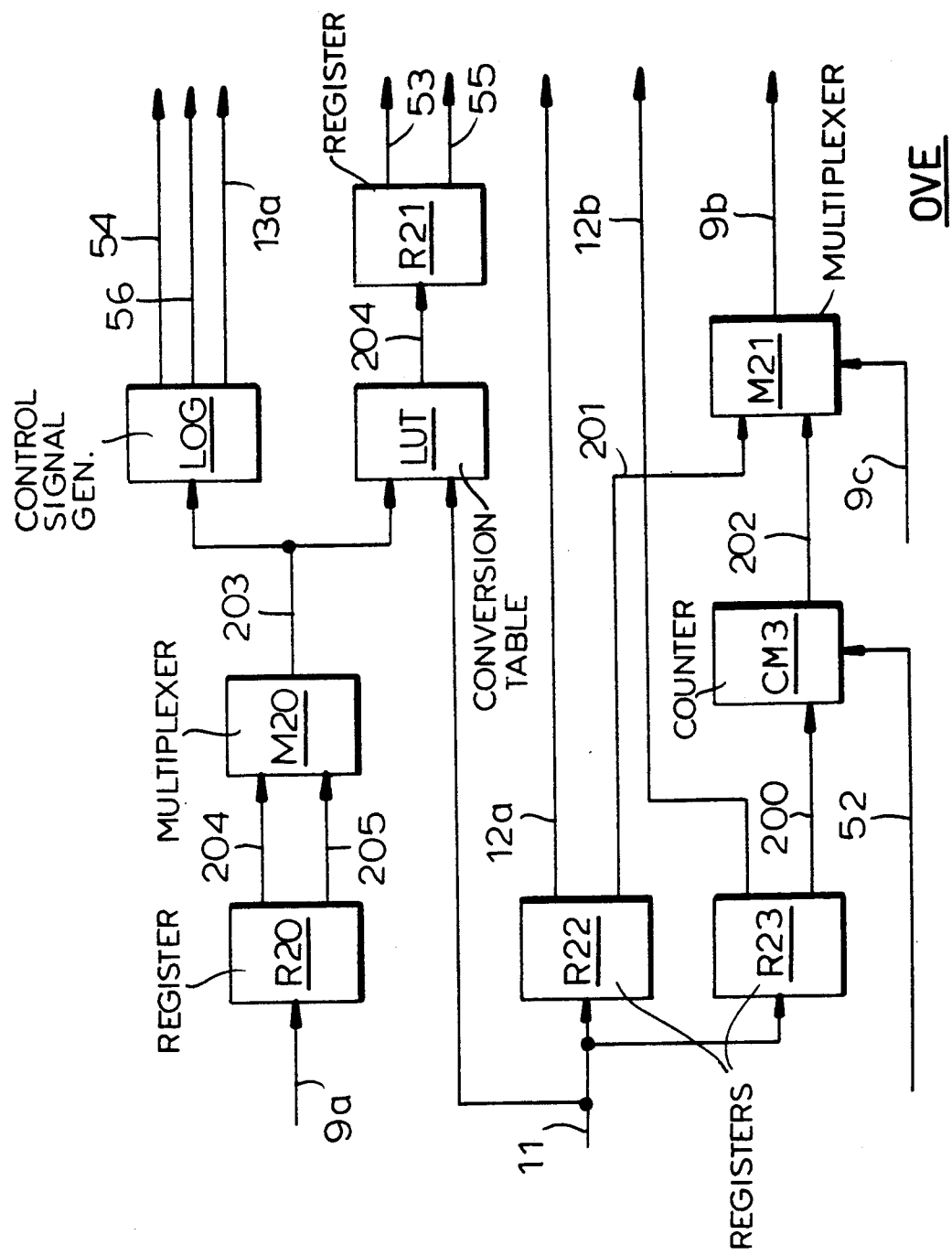
FIG. 10 is the block diagram of the block denoted by OVE in FIG. 3.

FIG. 10 shows the block diagram of the block denoted by OVE in FIG. 3. The main task of this circuit is the generation of control signals of external overlay memory. Besides it receives the overlay memory data and interprets them suitable. The counter denoted by CN3 generates the addresses for the overlay memory. This counter receives clock pulses at half-line frequency on connection 52 coming from block SYN (FIG. 3). The counter can be loaded through connection 200 with the contents of register R23, containing starting-line value used while scanning the overlay memory. The external microprocessor can write in this register through connection 11 and read its contents through connection 12b. Register R22 contains instead the starting column used for scanning the overlay memory. Also in this register the external microprocessor can write through connection 11 and read the contents through connection 12a.

The value of starting column is led through connection 201 to a multiplexer M21, whilst the other input receives on connection 202 the output of counter CN3. At the output of the multiplexer on connection 9b there are then present alternately the line or column address of the overlay memory, in function of the control signals on connection 9c. A register R20 stores the 8-bit value coming from the overlay memory on connection 9a. The subsequent multiplexer M20 alternately transfers to connection 203 the upper or lower part of this value, present on connections 204 and 205. The values of the new 4-bit format are sent to a conversion table LUT, which supplies at the output on connection 204 a 24-bit value per each of the 16 input values. 24-bit values, relevant to pixels, are programmable by the external microprocessor through connection 11.

The values on connection 204 are stored in register R21 and rendered available on connections 53 and 55 directed to muliplexers MX4 and MX3 (FIG. 3). Connection 203 is also led to a block LOG, which generates control signals of the above-mentioned muliplexers on connections 54 and 56. It generates also on wire 13a the control signal for the external multiplexer already mentioned.

It is clear that what has been is given by way of a non limiting example. Variations and modifications are possible without going out of the scope of the claims.

We claim:

1. A video control circuit for multimedia applications, which accepts at its input digital video signals according to CCIR 656 recommendation, video signals under luminance-chrominance Y,Cb,Cr format and renders available at its output correspondent signals in a digital parallel format, separated synchronism signals, and standard RGB signals which can be mixed with external video signals coming from an external video memory said circuit comprising:

a video flow decoder (INP), which receives at said input (1) the video digital signals, and extracts synchronisms and active data of each line, storing said data to obtain a synchronization of an outgoing flow (2), supplied under Y,Cb,Cr format;

a first multiplexer (MX2), transferring to the output (5) the video digital flow present at the input (1) and a generated video digital flow;

a video signal synchronizing block (VID), which receives at the input (7) video data under Y,Cb,Cr format together with control signals, synchronizes them using timings determined from the outside and varies parallelism of synchronized video data and control signals supplying them to a first output (21) or converting them into RGB format rendering the RGB format available at a second output (8), said block also controlling an external video memory, containing a secondary image superimposable to the current image and supplying (13) synchronism and state signals;

a programmable timing signal generator (TIM) connected to said video signal synchronizing block for supplying timing signals;

an interface (INT) for dialogue with said block (VID);

a second multiplexer (MX1), which transfers to another output (19) the data coming either from timing signal generator (TIM) or from said block (VID); and a conversion block (OUT) receiving timing signals from said timing signal generator, which converts data in Y,Cb,Cr format (2) into data in CCIR 656 format (4) and applying converted data as said generated video digital flow to said first multiplexer.

2. A video control circuit for multimedia applications as in claim 1, characterised in that said video flow decoder (INP) comprises:

two registers (R1,R3) wherein digital video data and the relevant timings are stored with a certain parallelism and read with a higher parallelism;

a frequency conversion block (FIF), basically consisting of a FIFO memory, wherein the digital video data supplied by said registers (R1,R3) are stored;

a first finite-state automaton (MS1), which extracts the synchronism information present in the digital data flow and renders them available at the output (2b) and checks daily validity;

a block for detecting synchronism errors (CRP), which analyses data and their parity and corrects an error or signals the presence of two of them to said finite-state automaton (MS1);

a register (R2) for storing the synchronism state and the relevant parity to send to the block for detecting synchronism errors (CRP);

a second finite-state automaton (MS2), controlling said frequency conversion block (FIF) on the basis of the information on the validity of data and clock signals.

3. A video control circuit for multimedia applications as in claim 1, characterised in that said block (VID) comprises:

a buffer memory of FIFO type (FOF), which stores input data (7a) under Y,Cb,Cr format and supplies them at the output (50) with higher parallelism;

a block for controlling data routing (OVE), which operates under the control of the external microprocessor (11) and of data coming from the external video memory (9a), generating the addresses and control signals for the external memory (9b) control, for an external video multiplexer (13a), for the memories containing the colour palette and supplying the three Y,Cb,Cr components (53) or the code under RGB format (55) to superimpose possibly to the image element coming from the outside;

a third multiplexer (MX3), which transfers to the output (21) either the Y,Cb,Cr code, supplied by said block for controlling data routing (OVE), or the Y,Cb,Cr code coming from said buffer memory (FOF) relevant to the main image, under the control (54) of the block for controlling data routing;

an arithmetic unit (MAD), which operates data conversion from Y,Cb,Cr format (21) into RGB format (57);

a fourth multiplexer (MX4), which transfers to its output (8) either RGB code relevant to the external video memory (55) or the RGB code coming (57) from said arithmetic unit (MAD), under the control (56) of said block for controlling data routing (OVE);

a timing generator (SYN), for said block for controlling data routing (OVE) and for said buffer memory of FIFO type (FOF).

4. Control circuit via multimedia applications as in claim 3, characterised in that said block for controlling data routing (OVE) comprises:

a third presettable counter (CN3), which counts pulses at half-line frequency (52) by generating line addresses (202) for said external video memory;

a first register (R23), wherein the external microprocessor can write the number of the starting line of scanning of the external video memory;

a second register (R22), wherein the external microprocessor can write the number of the starting column of scanning of the external video memory;

a ninth multiplexer (M21), which transfers alternately to the output (9b) the line or column address of the external video memory received from the third counter (CN3) or from the second register (R22);

a third register (R20), wherein data (9a) arriving from the external video memory are stored;

a tenth multiplexer (M20), which transfers alternately to the output (203) the higher or lower part of the data stored in said third register (R20);

a block (LOG), which generates control signals (54,56,13a) for said third and fourth muliplexers (MX3,MX4) and for an external multiplexer on the basis of the signals supplied by the tenth multiplexer (M20);

a conversion table (LUT), which is addressed by the datum supplied by the tenth multiplexer (M20) and supplies at the output (204) the value relevant to a pixel, all the values stored being programmable by the external microprocessor (11);

a fourth register (R21), which stores the values outgoing from said conversion table (LUT).

5. A video control circuit for multimedia applications as in claim 1, characterised in that said conversion block (OUT) comprises:

a set of registers (RX1,RX2,RX3) which store Y,Cb,Cr components of the pixel to be converted;

a block (COD) to generate codes relevant to the synchronism and parity information according to CCIR 656 recommendation;

a fifth multiplexer (MX5), mixing the Y,Cb,Cr components outgoing (60,61,62) from said set of registers with the codes generated by said block (COD);

a third finite-state automaton (MS3), which controls (64) said fifth multiplexer (MX5) and generates (67) control signals for the generation of the synchronism words of CCIR 656 flow;

a chain of registers (RX4,RX5), synchronizing the data supplied by said fifth multiplexer (MX5) through a controlled delay and introduces the synchronism words.

6. A video control circuit for multimedia applications as in claim 1, characterised in that said timing signal generator (TIM), has a portion (TIMa) for the generation of horizontal synchronism signals comprising:
- a set of registers (RLX,RCX,RDX,RWX) wherein the external microprocessor loads the values (L,C,D,W) of the different level durations of said horizontal synchronism signals;
- a presettable counter (CN1), which counts pulses (15b) at pixel frequency;
- a first comparator (CM1) which compares the signal at its first input (70) supplied by the counter with the value present at its second input (71);
- three high-impedance driving circuits (TR1,TR2,TR3), enabled in turn to supply signals (C,4*L,8*L), contained in two out of said set of registers (RCX,RLX) to the second input (71) of said first comparator;
- a fourth finite-state automaton (MS4) which enables in turn (73,74,75) said driving circuits and enables (76) the counter (CN1) to load the initial value supplied by a sixth multiplexer (MX6), generating at the output (10a) one of said horizontal synchronism signals, on the basis of signals (72,83) received from the first comparator and from a fifth finite-state automaton (MS6);
- an adder (AD1), which adds to the value (D) supplied by one (RDX) of said set of registers a constant value (N);
- said sixth multiplexer (MX6), which transfers to the output (77) a wired value (90) or the value supplied by the adder to preset the counter (CN1);
- a seventh multiplexer (MX7), which transfers to the output (80) one of the values (D,W) contained in two (RDX,RWX) of said set of registers;
- a second comparator (CM2), which compares the signal at its first input (75) supplied by the counter (CN1) with the value supplied by the seventh multiplexer;
- a sixth finite-state automaton (MS5), which generates at the output (10b) a second horizontal synchronism signal, on the basis of the signals received by the second comparator;
- said fifth finite-state automaton (MS6), which operates the synchronization of the portion (TIMa) for the generation of horizontal synchronism signals, checking the phase relationship existing between an external synchronism signal (15a) with a synchronism signal generated by the sixth finite-state automaton (MS5) and acting on the seventh multiplexer (MX6,MX7), on the counter (CN1), on the fourth and sixth finite-state automatons (MS4,MS5).

7. A video control circuit for multimedia applications as in claim 1, characterised in that said timing signal generator (TIM), has a portion (TIMb) for the generation of vertical synchronism signals, which comprises:
- a first block of registers (RVX), wherein the external microprocessor loads the values (BP,FP,BD,FD) of the durations of the different levels of a first vertical synchronism signal;
- a second presettable counter (CN2), which counts the pulses (10a) at a frequency twice as high as the line frequency;
- a third comparator (CM3), which compares the signal at its first input (90) supplied by the second counter with the value present at its second input (91);
- a ninth multiplexer (MX9), which transfers to the output (91) one of the values contained in said first block of registers (RVX);
- a seventh finite-state automaton (MS7), which selects (93) said ninth multiplexer (MX9) and enables (98) the second counter (CN2) to store the initial value supplied by an eighth multiplexer (MX8), generating at the output (10c,10e) two of said vertical synchronism signals, on the basis of the signals (92,108) received from the third comparator and from a ninth finite-state automaton (MS9);
- a second block of registers (RVY), wherein the external microprocessor loads the values (DV,WV,SW) of the durations of different levels of a second vertical synchronism signal;
- a fourth comparator (CM4), which compares the signal to its first input (101) supplied by said second counter with the value present at its second input (102);
- a tenth multiplexer (M10), which transfers to the output (102) one of the values contained in said second block of registers (RVY);
- an eight finite-state automaton (MS8), which selects (103) said tenth multiplexer (M10), generating to the output (10d) the third of said vertical synchronism signals, on the basis of signals (100,109) received from the fourth comparator and by a ninth finite-state automaton (MS9);
- an eighth multiplexer (MX8), which transfers to the output (99) a wired value (112) or the value supplied by the tenth multiplexer in order to preset the second counter (CN2), on the basis of a signal supplied by a ninth finite-state automaton (MS9);
- said ninth finite-state automaton (MS9), which operates the synchronization of the portion (TIMb) for the generation of vertical synchronism signals, by checking the phase-relationship existing between an external synchronism signal (15c) and a synchronism signal generated by the eight finite-state automaton (MS8) and acting on sixth and eight multiplexer (MX8), on the seventh and eighth finite-state automatons (MS7,MS8).

8. A video control circuit for multimedia applications as in claim 1, characterised in that said arithmetic unit (MAD) comprises:
- three registers (ZX1,ZX2,ZX3), wherein Y,Cb,Cr components, are stored;
- read-only memories (RO1,RO2,RO3,RO4) which, addressed with possible values of Cb and Cr, supply the same multiplied by numerical constants and algebraically summed to others;
- a set of registers (ZX4, . . . ,ZX9), wherein the signals supplied by said read-only memories as well as Y component are stored;
- a first and a second adder (AD3,AD4), which sum Y to the values computed by two (RO1,RO2) of said read-only memories to obtain R and B components of RGB signal;
- four registers (Z11,Z12,Z15,Z16) which store and allow synchronization of R and B components;
- a third adder (AD2), which adds the values computed by two (RO3,RO4) out of said read-only memories;
- two registers (Z10,Z13), which store and allow synchronization of Y component and of the signal supplied by said third adder (AD2);
- a fourth adder (AD5), which adds the signals supplied by said two registers (Z10,Z13) to obtain the G component of RGB signal;
- a register (Z14), storing and allowing synchronization of G component.

* * * * *